United States Patent Office 3,429,858
Patented Feb. 25, 1969

3,429,858
STYRENE/DIALKYL FUMARATE PROCESS USING A SOLUBILITY MODIFIER

Robert J. Slocombe, Kirkwood, Mo., and Ronald H. Dahms, Springfield, and Charles R. Williams, Longmeadow, Mass., assignors to Monsanto Company, St. Louis, Mo., a corporation of Delaware No Drawing. Filed Aug. 19, 1965, Ser. No. 481,112
U.S. Cl. 260—78.5 6 Claims
Int. Cl. C08f *19/10*

ABSTRACT OF THE DISCLOSURE

Described herein is an improvement in a process for the emulsion polymerization of copolymers of styrene and certain dialkyl fumarates wherein the improvement comprises carrying out the polymerization reaction in the presence of at least about 2% by weight based on the total amount of water of a solubility modifier selected from the group consisting of monohydric aliphatic alcohols having up to 5 carbon atoms, aliphatic ketones and cycloaliphatic ketones.

This invention relates to an improved emulsion polymerization process for the production of copolymers of styrene and certain dialkyl fumarates.

Copolymers of styrene and dialkyl fumarates have been described previously and processes for their production are known in the art. In the processes heretofore known and described, long chain dialkyl fumarates are copolymerized with styrene by using bulk or solution polymerization techniques. Batch emulsion polymerization of dialkyl fumarates and styrene is known to produce copolymer in latex form but only when the total number of carbon atoms in the alkyl portions of the ester groups, taken together, is equal to or less than about 14 carbon atoms. When the total number of carbon atoms is increased to 16 or more and batch emulsion polymerization is used, polystyrene is produced and most of the dialkyl fumarate is recovered as monomer.

Although styrene/dialkyl fumarate copolymer latices can be prepared by simple batch emulsion polymerization where the total number of carbon atoms in the alkyl groups is equal to or less than 14 carbon atoms, such copolymer latices are not entirely satisfactory in that without using any softening or plasticizing agents they possess relatively poor film-forming properties. Styrene/dialkyl fumarate copolymer latices wherein the alkyl portions of the fumarate, taken together, contain 16 or more carbon atoms possess excellent film-forming properties without the use of plasticizers or softening agents In copending application Ser. No. 481,103 filed of even date herewith in the names of the present inventors and assigned to the assignee of the present invention, a novel emulsion polymerization process for the copolymerization of styrene and long chain dialkyl fumarates is disclosed and claimed. The process disclosed in the above-identified application comprises effecting copolymerization of a mixture of styrene and fumaric acid ester of the formula

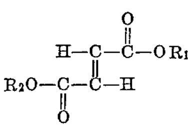

wherein $R_1$ and $R_2$, which may be the same or different, are selected from the group consisting of alkyl radicals having from 1 to 19 carbon atoms and the total number of carbon atoms in the radicals $R_1$ and $R_2$, taken together, is from 16 to 20, in aqueous emulsion the presence of a water-soluble polymerization catalyst, introducing an emulsified mixture of said monomers to the polymerization reaction mixture at about the time copolymerization begins, the composition of said added monomers being substantially the same as the composition of the monomers chemically combined in the forming copolymer, continuing the addition of emulsified monomer mixture during a substantial part of the copolymerization period at about the same rate copolymer is formed. Monomer-soluble catalyst can be used in addition to the water-soluble catalyst. The monomer-soluble catalyst is admixed with the monomers added during the reaction prior to their emulsification.

The alcohol residues, i.e., $R_1$ and $R_2$, are preferably those of saturated, straight chain or branched chain alcohols having from 4 to 16 carbon atoms but regardless of saturation or unsaturation and chain configuration, the total number of carbon atoms in both alcohol residues, taken together, must be from 16 to 20. It is not necessary that the carboxyl groups of the fumaric acid be esterified with the same alcohol or that the copolymer be formed with but a single fumaric acid ester. Mixed esters where 2, 3 or even 4 different alcohol residues are present may also be employed. It is only necessary that the fumaric acid ester or mixed ester fall within the formula given to be copolymerized with styrene in accordance with the process of this invention. The alkyl esters of fumaric acid can be prepared by any of the well-known methods.

The fumaric acid esters represented by the above structural formula have the empirical formula $C_nH_{2n-4}O_4$ where $n$ is an integer from 20 to 24. For the sake of brevity and simplicity the empirical formula will be used hereinafter in the specification and claims to represent the structural formula and limitations thereon given above.

It has been discovered in accordance with this invention that improved conversion of styrene and/or dialkyl fumarate can be obtained in the above process by employing a "solubility modifier" in the reaction mixture.

The term "solubility modifier" as used herein and in the appended claims means any water-soluble compound wherein the dialkyl fumarate monomers are at least partially soluble which does not interfere with copolymerization or adversely affect latex stability.

Solubility modifiers which have been found useful in this invention include, for example, monohydric aliphatic alcohols, such as methyl alcohol, ethyl alcohol, n-propyl alcohol, isopropyl alcohol, n-butyl alcohol, isobutyl alcohol, and amyl alcohol, and water soluble aliphatic and cycloaliphatic ketones such as methyl isopropyl ketone, methyl isobutyl ketone, methyl isoamyl ketone, diisopropyl ketone and cyclohexanone. Mixtures of these solubility modifiers may be used if desired.

In carrying out the improve process of this invention, an aqueous solution is made up containing emulsifying agent, solubility modifier and water-soluble polymerization catalyst. Any conventional emulsion polymerization equipment can be used. The initial monomer mixture of composition which will give copolymer having the desired percentage of monomer constituent, therein is emulsified with the aqueous solution containing emulsifying agent, solubility modifier and polymerization catalyst and the resulting emulsion is subjected to polymerization conditions. At substanitally the time copolymerization starts, additional monomers in the form of aqueous emulsion are introduced into the polymerization reaction mixture at about the same rate copolymer is being formed. The composition of the emulsified monomer mixture introduced during the polymerization period is substantially the same as the composition of the desired copolymer being formed. To produce substantitally homogeneous copolymers by this invention, the gradual addition of the emulsified monomer mixture should be extended over almost the full time required to copolymerize both the specific dialkyl fumarate and the proportion of dialkyl fumarate and styrene used. A supplemental heating time, with or without catalyst addition, equal to less than about 25 percent of the addition time may be used.

The amount of solubility modifier employed in this reaction is critical but only in regard to the lower limit. At least about 2 percent of solubility modifier based on the total amount of water in the polymerization reaction mixture must be employed to obtain satisfactory results. Generally amounts from at least about 2 percent as minimum up to 50 percent as maximum will be employed. Amounts in the range of about 4 percent to 20 percent are preferred. Amounts greater than 50 percent can be used but their use does not result in additional improvement and furthermore such amounts are uneconomical.

In carrying out the improved process of this invention a portion of the required amount of solubility modifier is usually present in the initial reaction mixture. The remaining solubility modifier may be present in the initial reaction mixture at the start of polymerization or it may be added during the reaction in a continuous or semi-continuous manner. For example, the solubility modifier may be added as a separate stream, in admixture with the catalyst or the emusified monomer mixture or any combination of these methods.

The monomer content of the initial emulsified mixture of monomers is generally from about 5 percent to 40 percent based on the total weight of initial emulsion. The monomer content of the emulsified mixture of monomers introduced into the reaction mixture during the polymerization period is generally from about 5 percent to 80 percent based on the total weight of the added emulsion.

The process of this invention has been found effective in the production of styrene/dialkyl fumarate copolymers containing from about 15 percent to 75 percent polymerized dialkyl fumarate. The preferred styrene dialkyl fumarate film-forming latices are those having from about 24 percent to 62 percent by weight of polymerized dialkylfumarate. In order to prepare these preferred latices initial monomer mixtures containing from about 7 percent to 45 percent by weight of dialkyl fumarate are used. With di-n-decyl fumarate the fumarate concentration in the initial monomer mixture is about 7 percent to 25 percent by weight of the initial monomer mixture in order to form the preferred latices. With di-n-octyl fumarate the fumarate concentration in the initial monomer mixture is about 9 percent to 45 percent by weight.

The exact composition of the initial monomer mixture needed to obtain copolymer of any desired composition within the above range is easily determined. The composition of an initial monomer mixture is selected arbitrarily and subjected to given reaction conditions. The first copolymer formed is withdrawn from the reaction mixture and analyzed. If this copolymer does not contain the desired proportion of polymerized monomer, the initial monomer composition is adjusted and the prcedure repeated. It is only a matter of a few trials and the exact composition of initial monomer is determined that will give the desired copolymer.

As stated hereinbefore the composition of the monomers in the emulsified monomer mixture added during the reaction is substantially the same as the composition of the desired copolymer. The rate of addition of the emulsified monomer mixture added during the reaction should be substantially the same as the rate at which copolymer forms. An addition rate somewhat in excess of reaction rate is not deleterious to the process as the polymerization can be continued for a substantial period after monomer addition is complete. Since polymerization reactivity of monomers may be affected by different catalysts, amounts of catalyst, temperatures and pressures, the addition rates will vary with differing sets of conditions. Reaction rate and therefore rate of addition of emulsified monomer mixture is easily ascertained by running a trial process, withdrawing samples of the reaction mixture at given intervals and measuring a physical or chemical property thereof, e.g., specific gravity. The amount of copolymer formed can be determined from the specific gravity of the reaction mixture. When the relationship between copolymer formed and specific gravity is correlated, the required rate of addition of emulsified monomer mixture is known. The addition of the emulsified monomer mixture to the polymerization reaction mixture can be carried out either continuously or intermittently. When intermittent addition is employed it is preferred that the increments of monomer addition be of such size and frequency that the concentration of constituents in the copolymerizing monomer mixture does not vary more than would cause a variation of more than about 15 percent in concentration of the major constituent in the copolymer from the average concentration of that constituent therein.

This invention is further illustrated by the following examples. Parts and percent are by weight unless otherwise indicated.

Example 1

Styrene/di-2-ethylhexyl fumarate (DEHF) copolymer is prepared from the following ingredients.

| | Parts |
|---|---|
| (A) Initial reaction mixture: | |
| (1) Styrene | 20 |
| DEHF | 10 |
| (2) Water | 168.6 |
| Triton X–770 [1] | 0.60 |
| Triton X–100 [2] | 0.85 |
| (B) Monomer mixture: | |
| Styrene | 100 |
| DEHF | 100 |
| Water | 80 |
| Triton X–770 [1] | 11.3 |
| (C) Catalyst mixture: | |
| Water | 200 |
| $K_2S_2O_8$ | 1.90 |

[1] Triton X–770 is a trade name for the sodium salt of an alkyl aryl polyether sulfate.
[2] Triton X–100 is a trade name for an isooctylphenoxy polyethoxyethanol.

The initial reaction mixture (A 1 and 2) is charged to a nitrogen-purged reaction vessel equipped with thermometer, stirring means, reflux condenser fitted with a Dean and Stark Trap and two addition funnels. The initial reaction mixture is refluxed at about 98° C. for 15 minutes and then monomer mixture B which had been emulsified in a Waring Blendor under nitrogen is added at a continuous rate over a 3¾ hour period. Catalyst mixture C is added at a continuous rate over a 4¾ hour period beginning 15 minutes prior to the addition of the emulsified monomer mixture. At the end of the catalyst addition the resulting latex is distilled and 23 g. styrene are recovered in a Dean and Stark Trap over about a 45 minute period. The latex is removed from the reaction vessel and about 29 g. of oily coagulum is separated from the latex.

Example 2

The procedure of Example 1 is repeated except that 9 parts methyl alcohol are added to the initial reaction mixture and 10 parts methyl alcohol are mixed with catalyst mixture C and added to the reaction vessel during the reaction. At the end of the catalyst addition the resulting latex is distilled and 15 gm. styrene are recovered over about a 45 minute period. The latex is removed from the reaction vessel and about 20 gm. of oily coagulum is separated from the latex.

Example 3

The procedure of Example 1 is repeated except that 1 part benzoyl peroxide is admixed with the monomer mixture B prior to emulsification. At the end of the catalyst addition the resulting latex is distilled and 17 gm. styrene are recovered over about a 30 minute period. The latex is removed from the reaction vessel and no oil or gummy residue, or coagulum is present.

Example 4

The procedure of Example 3 is repeated except that 9 parts n-butyl alcohol are added to the initial reaction mixture and 10 parts n-butyl alcohol are mixed with catalyst mixture C and added to the reaction vessel during the reaction. At the end of the catalyst addition the resulting latex is distilled and 9 gm. styrene are recovered over about a 45 minute period. The latex is removed from the reaction vessel. A smooth white latex containing no oily coagulum is obtained.

Examples 1 and 3 are control experiments. Example 2 shows that the use of a solubility modifier increases the conversion of both styrene and dialkyl fumarate. Example 4 shows that the use of a solubility modifier together with catalyst in both the monomer phase and aqueous phase results in complete conversion of styrene and dialkyl fumarate and thus the production of a near perfect latex containing no oily coagulum.

Examples 5–8 (Table 1)

The procedure of Example 2 is repeated except that in each example different dialkyl fumarates and solubility modifiers are used in place of di(2-ethylhexyl)fumarate and methyl alcohol. Results and further details are given below in Table 1.

TABLE 1

| Example No. | Dialkyl fumarate | Solubility modifier | Parts [1] | Styrene recovered, gm. | Coagulum, gm. |
|---|---|---|---|---|---|
| 5 | Di-n-octyl fumarate | Methyl isobutyl ketone | 12 | 17 | 20 |
| 6 | Di-n-decyl fumarate | Methyl isopropyl ketone | 28 | 42 | 31 |
| 7 | Di-trimethylheptyl fumarate | t-Amyl alcohol | 20 | 21 | 27 |
| 8 | n-Butyl-n-dodecyl fumarate | Cyclohexanone | 16 | 31 | 22 |

[1] Solubility modifier based on the total amount of water in the system.

Examples 5–8 above are repeated except that a solubility modifier is not employed. In each example the amount of coagulum recovered is substantially increased and the conversion of styrene is substantially reduced.

The copolymers prepared according to this invention may be used for the preparation of plastics, coatings, fibers, films, foils and adhesives. For any of these purposes, the polymers may be combined with or prepared in the presence of plasticizers, stabilizers, fillers, pigments, dyes, softeners, natural resins or other synthetic resins.

In cases in which the copolymers are to be used as coating or impregnating agents for porous materials, the latices can be applied directly to the material to be coated without the intermediate isolation of the polymer.

Examples of dialkyl fumarates which can be copolymerized with styrene in accordance with this invention include:

di-n-octyl fumarate
diisooctyl fumarate
dinonyl fumarate
didecyl fumarate
ethyloctadecyl fumarate
propylheptadecyl fumarate
ethyltetradecyl fumarate
butyldodecyl fumarate
hexyldecyl fumarate
heptyldecyl fumarate
octyldecyl fumarate
nonyldecyl fumarate The emulsifying agents employed in this invention are those commonly used in emulsion polymerization processes and are well known in the art. Suitable emulsifying agents include, e.g., soaps such as sodium and/or potassium myristate, laurate, oleate and stearate; alkali metal alkyl or alkylene sulfates or sulfonates such as potassium lauryl sulfate and stearyl sulfonate and the ammonium or ethanolamine salts thereof; water-soluble salts of sulfonated long chain mono- and di-alkyl substituted aryl hydrocarbons such as diisobutyl naphthalene sodium sulfonate and decyl benzene sodium sulfonate; and polyoxyethylene derivatives of alcohols, acids, ethers, phenols, amides, amines, etc., a large number of which generally satisfy one of the following formulae:

$$R{-}(OC_2H_4)_nOH$$
$$R{-}NH{-}(C_2H_4O)_nOH$$
$$R{-}COO(C_2H_4)_nH$$
$$R{-}CONH(C_2H_4O)_nH$$

wherein R is an aliphatic, aryl or alkyl-aryl hydrocarbon radical and $n$ is an integer from 6 to 30.

Among commercialy available emulsifying agents which can be used in accordance with the present invention there may be mentioned the product "Alphenyl" which corresponds to the first of the aforementioned formulae in which R is the butylphenylene radical and $n$ is 8, said product resulting from the condensation of about 8 mols of ethylene oxide with one mol of butyl phenol and the "Polyrad" products which correspond to the second of said formulae, wherein R—NH is the residue of rosin amine (dehydroabiethylamine) $R{-}NH_2$. In "Polyrad 1100," e.g., the integer $n$ is equal to 11. "Emulphor A" and "Ethofat 6060" are trade names of products which correspond to the third formulae, RCOO— being the residue of oleic acid in the former and stearic acid in the latter. Finally "Base LP12" is the trade name of a product corresponding to the first formula in which R is the residue of lauryl alcohol.

In carrying out the process of this invention a water-soluble polymerization catalyst is present in the aqueous phase of the emulsion polymerization reaction mixture. Some water-soluble catalyst is present in the initial reaction mixture in order that initial polymerization will occur. The remaining water-soluble catalyst may be present in the initial reaction mixture at the start of the polymerization or it may be added during the reaction in a continuous or semi-continuous manner. If desired, a monomer-soluble catalyst can be used in the reaction in addition to the water-soluble catalyst. The monomer soluble catalyst is admixed with the monomers present in the emulsified monomer mixture added during the reaction before the monomers are emulsified.

The polymerization catalyst used in this invention can be any of the well-known free-radical mechanisms and the reduction oxidation catalyst systems known as redox systems as long as the specific compound selected possesses the required solubility characteristics. Any of the well-known redox system catalysts such as potassium persulfate/sodium bicarbonate can be used in this invention.

When polymerization is initiated and carried on by virtue of free radicals, such radicals can be derived from added free-radical-supplying catalysts such as e.g. the peroxide polymerization catalysts and the azo-type polymerization catalysts. Those skilled in the art are now fully familiar with a large number of peroxide polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. Peroxide catalysts include, for example, benzoyl peroxide, ditertiary butyl peroxide, tertiary butyl hydroperoxide, diacetyl peroxide, diethyl peroxycarbonate, 2-phenyl propane-2-hydroperoxide (known also as cumene hydroperoxide) among the organic peroxides; and hydrogen peroxide, sodium or potassium persulfate, perborates and percarbonates; and other "per" compounds among the inorganic peroxides. The azo-type polymerization catalysts are also well-known to those skilled in the art.. These are characterized by the presence in the molecule of the group —N=N— bonded to one or two organic radicals, perferably at least one of the bonds being to a tertiary carbon atom. Azo-type catalysts include, for example, α,α-azodiisobutyronitrile, p-bromobenzenediazonium fluoborate, N-nitrose-p-bromoacetanilide, azomethane, phenyldiazonium halides, diazoaminobenzene, p-bromobenzenediazonium hydroxide and p-tolyldiazoaminobenzene.

Suitable water-soluble polymerization catalysts employed in this invention include, e.g., hydrogen peroxide, sodium or potassium persulfate, perborate and percarbonate, ammonium persulfate and redox systems. The water-soluble polymerization catalyst is used in small but catalytic amounts, which are generally not in excess of one percent by weight based upon the monomeric material. A suitable quantity is often in the range of 0.05 percent to 1.0 percent by weight with 0.25 percent to 0.75 percent by weight preferred.

Suitable monomer-soluble polymerization catalysts emloyed in this invention include, e.g., benzoyl peroxide, lauroyl peroxide, t-butyl-peroxide, t-bultyl-hydroperoxide, dicumyl hydroperoxide, cumene hydroperoxide, azobisisobutyronitrile, α,α-azodiisobutyronitrile and bis-benzene diazosuccinate. The amount of monomer soluble polymerization catalyst employed in this process is not critical. Minor amounts have been found to be suitable. Normally an amount between about 0.05 percent and 0.7 percent based on the monomers is employed although the preferred amount is from about 0.1 percent to 0.5 percent.

Atmospheric, superatmospheric or subatmospheric pressures may be employed in the polymerization reaction of this invention.

While aqueous emulsion polymerization can be conducted at temperatures ranging from a temperature just above the freezing temperature up to the reflux temperature of the aqueous reaction mixture, more practical operating temperatures in accordance with this invention are in the range of about 35° C. to 100° C.

What is claimed is:

1. In a process for the copolymerization of styrene and dialkyl fumarates containing from 20 to 24 carbon atoms wherein a mixture of said monomers is subjected to polymerization conditions in aqueous emulsion in the presence of water-soluble polymerization catalyst; an emulsified mixture of said monomers is added to the reaction mixture at about the time copolymerization begins, the composition of said added monomers being substantially the same as the composition of the monomers chemically combined in the forming copolymer, and the addition of emulsified monomer mixture is continued during a substantial part of the copolymerization period at about the same rate copolymer is formed, the improvement which comprises carrying out the polymerization reaction in the presence of at least about 2 percent by weight based on the total amount of water of a solubility modifier selected from the group consisting of monohydric aliphatic alcohols having up to five carbon atoms, aliphatic ketones and cycloaliphatic ketones.

2. Process of claim 1 wherein the solubility modifier is methyl alcohol.

3. Process of claim 1 wherein the solubility modifier is ethyl alcohol.

4. Process of claim 1 wherein the solubility modifier is selected from the group consisting of methyl isobutyl ketone, methyl isopropyl ketone and diisopropyl ketone.

5. Process of claim 1 wherein the monomers in the emulsified monomer mixture introduced during the reaction are admixed with a monomer-soluble polymerization catalyst prior to emulsification.

6. Process of claim 1 wherein the solubility modifier is present in an amount from about 4 percent to about 20 percent by weight.

References Cited

UNITED STATES PATENTS 2,673,193 3/1954 Kolvoort ---------- 260—92.8

JOSEPH L. SCHOFER, *Primary Examiner.*

J. KIGHT III, *Assistant Examiner.*

U.S. Cl. X.R.

260—32.8, 33.4